United States Patent [19]

Funahashi et al.

[11] Patent Number: 5,525,224
[45] Date of Patent: Jun. 11, 1996

[54] APPARATUS FOR IMPROVING CITY WATER

[75] Inventors: Isao Funahashi, Iwaki; Kiwamu Yamamoto, Yokosuka, both of Japan

[73] Assignee: Kureha Kagaku Kogyo Kabushiki Kaisha, Japan

[21] Appl. No.: 337,361

[22] Filed: Nov. 8, 1994

Related U.S. Application Data

[62] Division of Ser. No. 939,514, Sep. 8, 1992, Pat. No. 5,391,302.

[30] Foreign Application Priority Data

Oct. 9, 1991 [JP] Japan .................................. 3-262271

[51] Int. Cl.⁶ .................................................. C02F 5/02
[52] U.S. Cl. ...................................................... 210/205
[58] Field of Search ............................ 210/205, 696, 210/709, 717, 743, 749, 206–208, 219, 319; 422/14

[56] References Cited

U.S. PATENT DOCUMENTS

| | | | |
|---|---|---|---|
| 1,683,521 | 9/1928 | Bourgognion et al. | 422/14 |
| 4,366,142 | 12/1982 | Kojima et al. | 423/640 |
| 4,389,376 | 6/1983 | Kojima et al. | 422/228 |

FOREIGN PATENT DOCUMENTS

| | | |
|---|---|---|
| 0380299 | 8/1990 | European Pat. Off. . |
| 2376079 | 7/1978 | France . |
| 2616451 | 12/1988 | France . |
| 62-23634 | 5/1987 | Japan . |
| 2048107 | 12/1980 | United Kingdom . |

*Primary Examiner*—Thomas G. Wyse
*Attorney, Agent, or Firm*—Nixon & Vanderhye

[57] ABSTRACT

The present invention lies in a method of improving a Langelier index and pH of city water wherein undissolved matter (calcium carbonate and slaked lime covered with calcium carbonate) slurry produced in a slaked lime dissolving vessel is mixed and reacted with carbonic acid-containing water in a mixing and reacting vessel to make a calcium hydrogen carbonate aqueous solution so as to continuously add to water in a water-receiving vessel together with a slaked lime aqueous solution, with which a utilization percentage of undissolved matter which has hitherto had a low utilization percentage is increased, and the Langelier index can be improved.

1 Claim, 1 Drawing Sheet

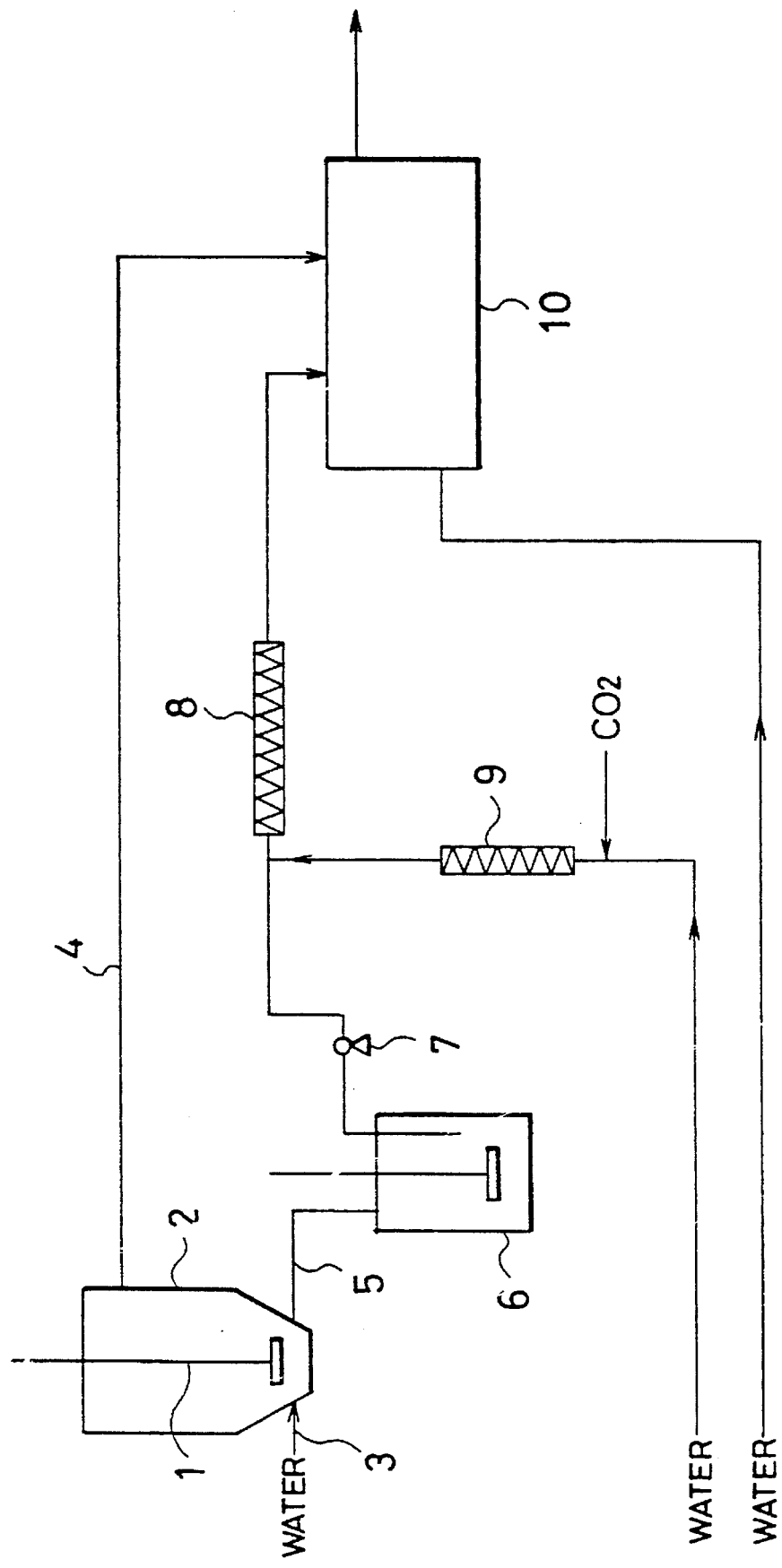

5,525,224

APPARATUS FOR IMPROVING CITY WATER

This is a division of application Ser. No. 07/939,514 filed Sep. 8, 1992, now U.S. Pat. No. 5,391,302.

BACKGROUND OF THE INVENTION

The present invention relates to a method of and an apparatus for improving the Langelier index and pH of city water for preventing corrosion of city water pipes.

Conventionally, as the technology for preventing corrosion of water pipes, in other words, the technology for preventing red rust water, the caustic soda injection method, the soda ash injection method, the slaked lime injection method and the like are known, however, the slaked lime injection method recently draws attention. The reasons why slaked lime is often adopted in water purifying plants are as follows. (1) The slaked lime not only increases the pH of water, it also improves the Langelier index, (2) it has calcium component which is said to be also good for health as its main component, and (3) a technique for injecting slaked lime not as powder but as an aqueous solution has been developed (for example, U.S. Pat. No. 4,366,142) and the like.

However, when the slaked lime is injected as an aqueous solution, since a larger of smaller amount of carbonic acid is dissolved in water to be used for producing a slaked lime aqueous solution, it is impossible to avoid the formation of calcium carbonate during dissolution of the slaked lime. In addition, calcium carbonate is formed on the surfaces of undissolved slaked lime particles, so that depending on the carbonic acid content of the water used to dissolved the slaked line, the an amount of solid matters remaining as undissolved matters during production of the slaked lime aqueous solution reaches ten and several % of the raw material slaked lime. Thus, other than a problem of lowering the effective utilization percentage of slaked lime, a problem occurs in the treatment of non-utilized solid matters which is typically discarded.

On the other hand, according to the water quality standard, the pH of city drinking water is determined to be 5.8 to 8.6, however, from a viewpoint of preventing of corrosion of water pipes, that is prevention of red rust water, it is preferable that the pH of city water is higher, and it is desired to be at least not less than pH 7.0, and to have the Langelier index of not less than −1.0, preferably not less than −0.5, more preferably −0.5 to 0.5.

Thus, the subject of the present invention is to provide complete utilization of slaked lime, namely to utilize it without any remaining undissolved calcium and to provide a method of improving both the pH and the Langelier index of city water and an apparatus for carrying out it.

In this case, the Langelier index (LI) is an overall index of city water comprising the calcium hardness, pH and alkalinity, which is represented by the following equation:

$$LI = pH - pHs = pH - 8.313 + \log[Ca^{2+}] + \log[A] - s$$

wherein;
pH; measured pH value of water to be tested
pHs; theoretical pH value of water to be tested when $CaCO_3$ in the water maintains equilibrium according to the following equation; $Ca^{++} + HCO_3^- \leftrightarrow CaCO_3 + H^+$,
$\log[Ca^{2+}]$; logarithm of calcium ion concentration
$\log[A]$; logarithm of overall alkalinity
s; correction value.

SUMMARY OF THE INVENTION

An object of the present invention is to provide a method of improving the Langelier index and pH of city water using slaked lime comprising the steps of: (1) removing any undissolved matter remaining in a slaked lime dissolving vessel during the production of a slaked lime aqueous solution as slurry, (2) mixing and reacting the slurry with carbonic acid-containing water to produce a calcium hydrogen carbonate aqueous solution, and (3) adding the aqueous solution to city water together with the slaked lime aqueous solution obtained in the slaked lime dissolving vessel.

Further, another object of the present invention is to provide an apparatus for carrying out the above-mentioned method, that is an apparatus for improving city water comprising a slaked lime dissolving vessel for producing a slaked lime aqueous solution provided with an agitation mechanism, a slurry vessel for withdrawing an undissolved matter as a slurry, a mixing and reacting vessel for mixing and reacting the undissolved matter slurry with carbonic acid-containing water to produce a calcium hydrogen carbonate aqueous solution, and a water-receiving vessel for adding the slaked lime aqueous solution and the calcium hydrogen carbonate aqueous solution to city water.

BRIEF EXPLANATION OF THE DRAWING

FIG. 1 is a flow sheet showing an embodiment of the improving method for city water according to the present invention.

In the FIGURE, 1 is an agitation mechanism, 2 is a slaked lime dissolving vessel, 6 is a slurry vessel, 8 is a mixing and reacting vessel, 9 is a line mixer, and 10 is a water-receiving vessel.

DETAILED DESCRIPTION OF THE PRESENT INVENTION

The present invention will be explained in detail hereinafter in accordance with FIG. 1.

The production of a slaked lime aqueous solution to be added to city water used for improving city water in the present invention is achieved as follows. A dissolving vessel 2 having an agitation mechanism 1, for example an ordinary stirrer as exemplified in U.S. Pat. No. 4,366,142 is filled with water beforehand, and a predetermined amount of slaked lime is introduced, and then water is supplied from a water supply pipe 3 at a lower portion of the vessel with agitation at a low speed, thereby a substantially saturated aqueous solution of slaked lime is withdrawn from a withdrawing pipe 4 at an upper portion of the vessel. The obtained slaked lime aqueous solution is mainly used for adjustment of pH of the city water. The slaked lime aqueous solution for pH adjustment can be used for any one of the pre-alkali treatment, intermediate alkali treatment and post-alkali treatment during the water purifying treatment. The term city water means water as used herein subjected to ordinary water purifying treatment to be rendered capable of drinking.

As water to be used for the formation of the slaked lime aqueous solution, water subjected to ordinary water purifying treatment in a water purifying plant is used, however, it is inevitable that it will contain at least some carbonic acid of various amounts depending on water sources. Thus, a part of slaked lime becomes scarcely soluble calcium carbonate in the slaked lime dissolving vessel, and most of the calcium carbonate is formed on surfaces of slaked lime particles, so that the slaked lime covered with calcium carbonate also remains undissolved. Therefore, most of undissolved solid matters comprise calcium carbonate and slaked lime, an amount of which is 10% to approximately 20% of raw material slaked lime depending on the carbonic acid content of the dissolving water. The undissolved solid is withdrawn from a slurry withdrawing pipe 5 at a lower portion of the dissolving vessel, which is once stored in a slurry vessel 6 and then quantitatively sent to a mixing and reacting vessel 8 by means of a pump 7, so as to be used for production of calcium hydrogen carbonate, thereby almost all of it is dissolved.

The calcium component to be used for improving city water is added in the form of calcium hydroxide for adjustment of pH, and for improving the Langelier index. It is added in the form of calcium hydrogen carbonate which does not significantly affect change in pH. The ratio of addition of calcium hydroxide and calcium hydrogen carbonate is different depending on the nature of source water (Langelier index, pH, carbonic acid concentration and the like) and desired Langelier index and pH in the improvement, however, the amount of added calcium hydrogen carbonate is at least ¼, or often not less than half the amount of calcium hydroxide, so that even when the undissolved matter reaches 20% of the raw material slaked lime during production of the slaked lime aqueous solution, there is no problem because according to the present invention it is added in the form of calcium hydrogen carbonate.

The undissolved solid in the slaked lime dissolving vessel 2 is withdrawn from the lower portion of the dissolving vessel 2 and is transferred to the slurry vessel 6 via the pipe 5, however, the concentration of the slurry at this time, that is, the amount of the slaked lime aqueous solution withdrawn together with the undissolved solid is optionally determined in accordance with an ultimately desired Langelier index, the nature of source water and the like. In many cases, this slurry is subjected to the following production of calcium hydrogen carbonate in a concentration of 1 to 10%, preferably 2 to 5%, so that the slurry concentration withdrawn from the slaked lime dissolving vessel is preferably performed at a concentration of 1 to 10%. Indeed, it is also possible that the slurry concentration withdrawn from the slaked lime dissolving vessel is performed at a higher concentration, and then water is separately added to adjust it to a concentration suitable for the following reaction.

The production of calcium hydrogen carbonate is performed by mixing and reacting the undissolved solid slurry in the dissolving vessel 2 with the carbonic acid-containing water, and a line mixer is preferable as the mixing and reacting vessel, because it has an easy mixing and reacting property and the apparatus can be made compact. The carbonic acid-containing water to be used herein can be obtained by injecting carbon dioxide gas into city water and allowing it to dissolve. The carbonic acid content of this carbonic acid-containing water may be an amount sufficient for converting all calcium from the slurry vessel 6 simultaneously supplied to the reacting an mixing vessel 8 into the form of calcium hydrogen carbonate. Therefore, considering the calcium content in the slurry supplied to the reacting and mixing vessel 8, the carbonic acid concentration and the supplied amount of carbonic acid-containing water are determined. The higher the carbonic acid concentration of the carbonic acid-containing water is, the more preferable it is, and a carbonic acid aqueous solution not less than 100 ppm, desirably not less than 300 ppm, more desirably not less than 400 ppm is used. For this purpose, it is preferable to dissolve carbon dioxide gas in water by force using the line mixer 9 under pressure, preferably under pressure of 2 to 3 kg/cm$^2$. As the line mixer, one having a structure in which a porous plate or a filler is installed in a pipe passage is used.

The calcium hydrogen carbonate aqueous solution obtained in the mixing and reacting vessel 8 is injected into city water in a water-receiving vessel 10 in order to improve the Langelier index of city water. It is necessary for converting all calcium into the form of calcium hydrogen carbonate in the mixing and reacting vessel 8 to allow free carbonic acid to remain as represented by the following formula, however, the remaining amount of unnecessarily excess carbonic acid makes the pH of water acid. Therefore, it is suitable also for the improvement in the Langelier index to use the substantially saturated aqueous solution of slaked lime obtained in the dissolving vessel 2 as the alkali for adjusting pH after injecting this calcium hydrogen carbonate aqueous solution into city water.

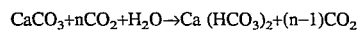

$$CaCO_3 + nCO_2 + H_2O \rightarrow Ca(HCO_3)_2 + (n-1)CO_2$$

The substantially saturated aqueous solution of slaked lime obtained in the slaked lime dissolving vessel may be directly injected into the water-receiving vessel from the dissolving vessel, or may be stored in a storage vessel for later use.

When slaked lime is made into the aqueous solution to use for preventing corrosion of water pipes, namely for preventing red rust water, ten and several % of the slaked lime becomes undissolved calcium carbonate or slaked lime particles covered with calcium carbonate, which previously has been discarded as insoluble, however, according to the present invention, almost all of the undissolved calcium components can be dissolved by reacting with the carbonic acid containing water, and further the calcium hydrogen carbonate thus obtained can be profitably utilized for improving the Langelier index.

EXAMPLE

An experiment was conducted using an apparatus as shown in FIG. 1 consisting of a slaked lime dissolving vessel of 250 l, a slurry vessel of 75 l, a line mixer for dissolving carbon dioxide gas having a length of 1 m, a line mixer for producing calcium hydrogen carbonate having a length of 1 m, and a water-receiving vessel of 1 m$^3$. City water, which was used for this experiment, had a calcium hardness of 41.3 ppm, an overall alkalinity of 60.4 ppm, a free carbonic acid concentration of 26.8 ppm, pH of 6.2 and a Langelier index of −2.3.

13 kg of slaked lime was charged into the slaked lime dissolving vessel, and city water was supplied from a lower portion of the vessel to form a substantially saturated slaked lime aqueous solution (about 1600 ppm in concentration), and when the obtained slaked lime aqueous solution was withdrawn from an upper portion of the vessel and used for improving quality of the city water, the undissolved solid was about 2 kg at the time (after 46 hours) when a slaked lime concentration of water obtained from the slaked lime dissolving vessel lowered to 1000 ppm. This undissolved solid was withdrawn from the lower portion of the vessel to the slurry vessel as slurry having a concentration of about 3%. This undissolved solid was calcium carbonate and slaked lime covered with calcium carbonate.

The city water was treated using this slurry and the slaked lime aqueous solution obtained from the slaked lime dissolving vessel.

In a similar manner as described above, 13 kg of slaked lime was charged into the slaked lime dissolving vessel, and city water was supplied from the lower portion of the vessel in 168 kg/Hr to continuously produce a slaked lime aqueous solution having a concentration of about 1600 ppm. On the other hand, when 88.6 kg/Hr of water and 0.05 kg/Hr of carbon dioxide gas were supplied to the line mixer, carbonic acid-containing water having a free carbonic acid concentration of 564 ppm was formed under pressure of about 2 kg/m$^2$, and 1.4 kg/Hr of slurry having a concentration of about 3% was supplied from the slurry vessel to the line mixer for forming calcium hydrogen carbonate, then there was little solid content, and a calcium hydrogen carbonate aqueous solution of 1000 ppm was obtained.

When 90 kg/Hr of this calcium hydrogen carbonate aqueous solution and 169 kg/Hr of the slaked lime aqueous solution obtained in the slaked lime dissolving vessel were continuously injected under agitation into the water-receiving vessel to which 10 m$^3$/Hr of city water was continuously supplied, the obtained water had a Langelier index of 0 and pH of 8.0.

What is claimed is:

1. An apparatus for improving the Langelier Index and pH of city water comprising:
    (a) a slaked lime dissolving vessel for producing a slaked lime aqueous solution the vessel having an agitation mechanism;
    (b) means for withdrawing undissolved matter as a slurry;
    (c) a slurry vessel for storing the slurry;
    (d) a line mixer for dissolving carbon dioxide into water to produce a carbonic acid-containing water wherein carbon dioxide is dissolved into water under pressure;
    (e) a line mixer for mixing and reacting the undissolved matter slurry with the carbonic acid-containing water to produce a calcium hydrogen carbonate aqueous solution; and
    (f) a water-receiving vessel for adding the slaked lime aqueous solution and the calcium hydrogen carbonate aqueous solution to city water.

* * * * *